(12) United States Patent
Betzl et al.

(10) Patent No.: US 7,578,549 B2
(45) Date of Patent: Aug. 25, 2009

(54) VEHICLE ROOF

(75) Inventors: Thomas Betzl, Andechs (DE); Alexander Bross, Wessling (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/066,291

(22) PCT Filed: Sep. 6, 2006

(86) PCT No.: PCT/DE2006/001566

§ 371 (c)(1),
(2), (4) Date: May 9, 2008

(87) PCT Pub. No.: WO2007/028371

PCT Pub. Date: Mar. 15, 2007

(65) Prior Publication Data

US 2008/0224503 A1    Sep. 18, 2008

(30) Foreign Application Priority Data

Sep. 9, 2005    (DE) .................. 10 2005 043 020

(51) Int. Cl.
B60J 7/14    (2006.01)
(52) U.S. Cl. .................. 296/213; 296/108
(58) Field of Classification Search .......... 296/213, 296/108
See application file for complete search history.

(56) References Cited

U.S. PATENT DOCUMENTS

| 7,374,234 B2 * | 5/2008 | Deschatres et al. ........ 296/208 |
| 2003/0025351 A1 * | 2/2003 | Graf et al. ........ 296/108 |

FOREIGN PATENT DOCUMENTS

| DE | 38 08 224 | 9/1988 |
| DE | 195 39 086 | 10/1996 |
| DE | 195 40 413 | 10/1996 |
| EP | 1 103 402 | 5/2001 |

* cited by examiner

*Primary Examiner*—Joseph D Pape
(74) *Attorney, Agent, or Firm*—Fitch Even Tabin & Flannery; John M. Naber

(57) ABSTRACT

The invention relates to a vehicle roof, which comprises at least two rigid roof sections, which can be displaced between a closed position that covers the vehicle interior and a storage position that exposes the vehicle interior and which are arranged one behind the other in the longitudinal direction in the closed position and are stowed in a concealed storage compartment in the stored position. The roof is equipped with a sliding roof cover element that runs over the exterior and that is guided in an assembly that extends on both sides of the vehicle in the longitudinal direction. To reliably drain leaked water from the region of the guide assembly, a water drainage channel (56) is located beneath the guide assembly.

9 Claims, 7 Drawing Sheets

VEHICLE ROOF

This application is a 35 U.S.C. §371 National Stage entry of PCT/DE2006/001566, filed Sep. 6, 2006, which claims priority from German Patent Application No.: DE 10 2005 043 020.1, filed Sep. 9, 2005, the contents of which are herein incorporated by reference.

The invention relates to a vehicle roof with at least two rigid roof segments which can be displaced between a closed position covering a vehicle interior and a storage position opening up the vehicle interior.

A vehicle roof of this type is known, for example, from DE 195 39 086 C1 and is designed as an "RHT (Retractable Hard Top)" roof of a motor vehicle in the form of a convertible. The vehicle roof known from DE 195 39 086 C1 is designed in five parts and comprises a front roof segment which borders a front cowl and, in the closed position of the roof, is bounded on both sides by a respective roof side rail segment. The front roof segment is bordered by a central roof segment which, in turn, is bordered by a rear roof segment. Starting from the closed position, the individual roof segments can be pivoted one above another in such a manner that they can be stored in a convertible-top storage compartment.

If the front roof segment is now to be designed as a cover element of a sliding roof which runs over the outside, it is necessary for the cover element to be formed both in the region of the two roof side rails and in the region of the central roof segment. In particular in the region of the central roof segment, support elements have to be able to engage in the guides through slots extending in the longitudinal direction of the vehicle. For sealing purposes, sealing means through which support elements of the cover element reach can be provided in the region of the slots. However, in spite of the means of sealing against leakages, there may be an undesirable accumulation of leak water in the region of the guides.

The invention is based on the object of providing a vehicle roof of the generic type mentioned in the introduction, which vehicle roof is provided with a sliding roof which runs over the outside, and in which leak water can be removed from the region of the guides of the sliding roof in a simple manner.

This object it achieved according to the invention by the vehicle roof with the features of patent claim 1.

The core of the invention is consequently to provide a vehicle roof of a convertible, which vehicle roof is designed as an "RHT" with a water collecting device in the region of the guide arrangements of a sliding roof which runs over the outside, said water collecting device collecting leak water and being able to transport it away in the longitudinal direction of the vehicle. Leak water which penetrates from above via slots present in the roof into the guide arrangement of the sliding roof, which can be opened outward, therefore cannot impair the operation of the sliding roof and an opening and closing mechanism of the vehicle roof and also, when the vehicle roof is stored in the convertible-top storage compartment, cannot drip in an uncontrolled manner from the roof segments but rather can be removed without causing damage. With the water drainage channel, deeper regions of the guide arrangements can also be drained.

To remove the leak water from the water drainage channel, which is manufactured, in particular, from plastic, said water drainage channel can be emptied in its rear region via a drain hose. The drain hose, which, in particular, branches off on the rear end side, is guided, for example, along a system of links for opening and closing the vehicle roof to a wheel house on the relevant guide arrangement side or to a side window shaft.

In order to be able to absorb movements of the system of links, it is advantageous if the drain hose has an expansion-bellows-like insert which increase the flexibility of the drain hose in critical regions.

Furthermore, it is advantageous if the water drainage channel is provided on its front end side with a connecting piece which, in the closed position of the vehicle roof, engages in an opening of a front cowl. Said opening is then expediently connected to a drain passage which leads, for example via a A-pillar of the relevant vehicle side, to a front wheel house and removes the leak water via the latter. The leak water can then be removed independently of the direction of inclination of the vehicle or of the water drainage channel.

In order also to be able to remove in a controlled manner leak water which accumulates in a sealing and drainage system arranged between the roof segments, it is advantageous if the rear water drain hose is provided with a T piece into which a passage of a sealing and drainage system arranged between the roof systems opens. The sealing and drainage system then does not have to be provided with possibly annoying openings to the outside of the vehicle.

The design of a vehicle roof in the context of the invention is advantageous in particular if the vehicle roof has two roof side rail segments, between which a front roof segment, which serves as an outwardly opening sliding cover, and a central roof segment, to which a rear roof segment is adjoined in the closed position, are arranged, with a guide arrangement for the outwardly opening sliding cover being arranged in each case between the roof side rail segments, on the one hand, and the front roof segment and the central roof segment, on the other hand, and, in the closed position, the sealing and drainage system being arranged in the transition regions between the individual segments. The guide arrangement for the sliding roof cover element which runs over the outside is then fixed to the roof side rail segments and to the central roof segment.

In a special embodiment of the vehicle roof according to the invention, the roof side rail segments can be pivoted outward with reference to the longitudinal center plane of the vehicle and can then be stored in a convertible-top storage compartment, with the front ends of the roof side rail segments then being stored laterally next to a rear bench. Such a pivoting of the roof side rail segments increases the lateral space provision in the rear region of the vehicle. In this embodiment, it is expedient if the guide arrangements on both sides of the sliding roof cover element which runs over the outside are each formed from two subsections. The front subsection is then pivoted outward together with the respective roof side rail segment while the rear subsection remains connected to the central roof segment. In order to be able to absorb the relative movement between the two subsections of the respective guide arrangement, the water drainage channel assigned to the respective guide arrangement is preferably provided with an elastically extendable section in the region of the transition between the subsections. Said section may be designed in particular in the manner of a bellows.

The sealing and drainage system is preferably designed in such a manner that it has at least one trough-like section at which the passage leading to the T section of the rear drain hose emerges. This also opposes the sealing and drainage system overflowing in the event of large amounts of leak water.

The fixing of the water drainage channel can take place in diverse ways, but, in a preferred embodiment of the vehicle roof according to the invention, is designed in such a manner that the water drainage channel is latched to the guide arrangement. This can take place by means of latching rails which are formed on both sides of the water drainage channel and each engage in a corresponding undercut of the guide arrangement concerned.

Further advantages and advantageous refinements of the subject matter according to the invention can be gathered from the description, the drawing and the patent claims.

An exemplary embodiment of the vehicle roof according to the invention is illustrated schematically in simplified form in the drawing and is explained in more detail in the description below. In the drawing FIG. 1 shows a perspective plan view of a vehicle roof according to the invention;

FIG. 1 illustrates the closed position in which the vehicle roof 10 forms a rigid roof skin of the vehicle concerned. In order to open up the vehicle interior, the vehicle roof 10 can be stored in a rear convertible-top storage compartment which is likewise not illustrated specifically here and is designed in a customary manner.

Figure 1:
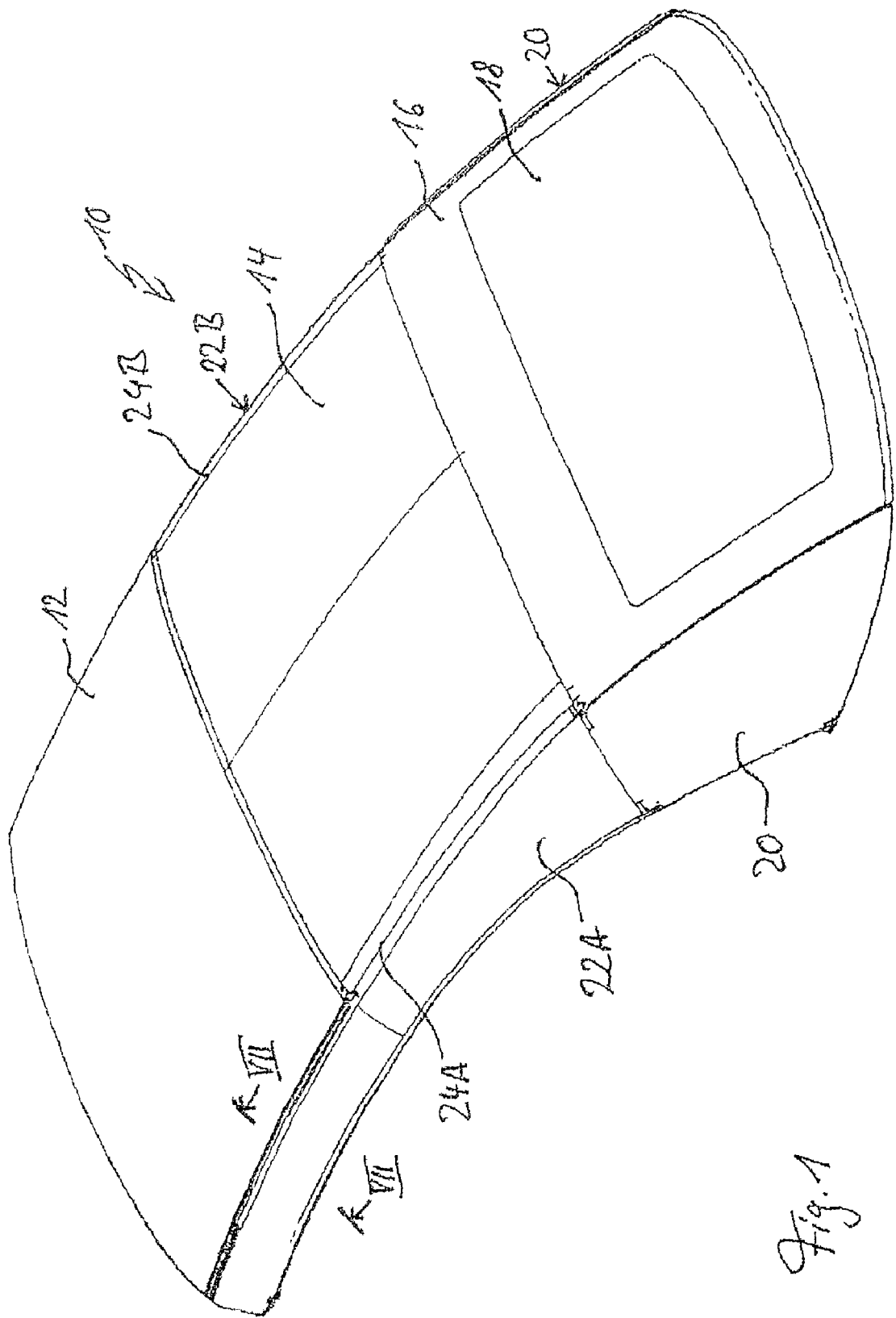
FIG. 1 illustrates a vehicle roof 10 which is an "RHT" (Retractable Hard Top) of a motor vehicle in the form of a convertible and can optionally be displaced between a closed position covering a vehicle interior and a storage position opening up the vehicle interior.
Figure 5:
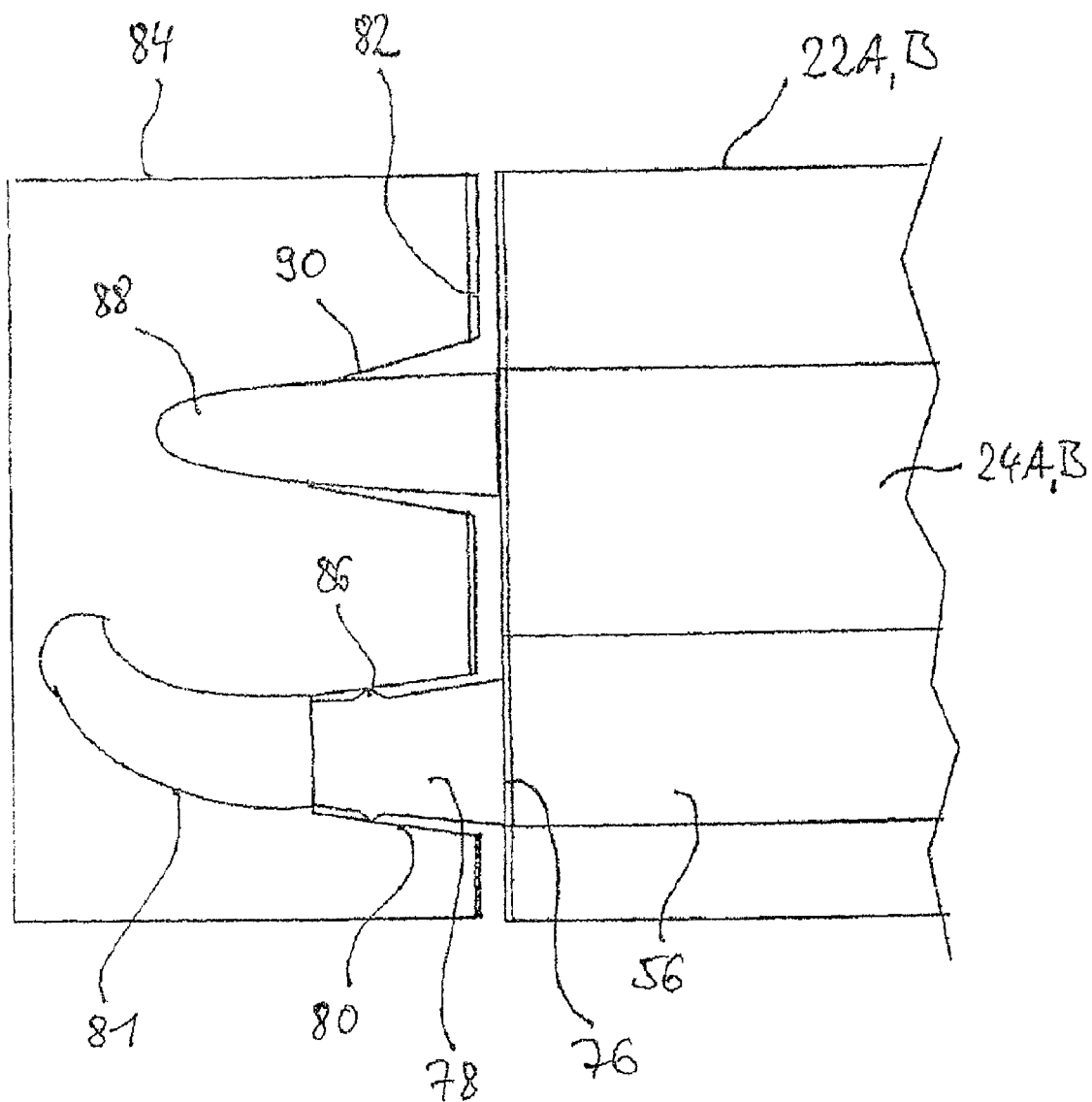
FIG. 5 shows a highly schematized section through a cowl with a roof side rail segment connected thereto.
Figure 6:
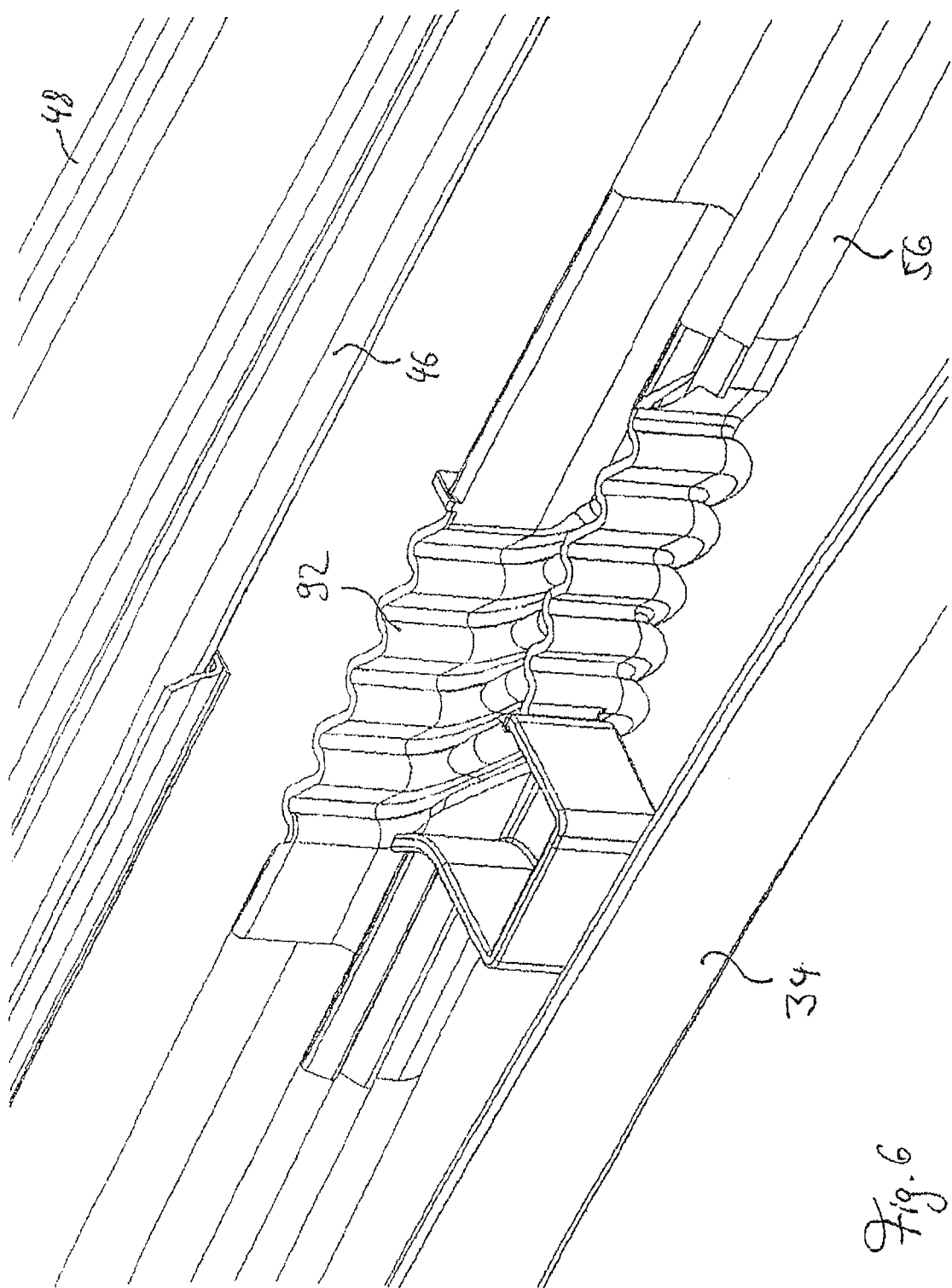
FIG. 6 shows an enlarged view of the region VI in FIG. 2.

The vehicle roof 10 comprises a front roof segment 12, a central roof segment 14 and a rear roof segment 16 which receives a rear window 18 of the motor vehicle and comprises "C" pillars 20 of the main structure of the vehicle. Furthermore, the vehicle roof 10 comprises a left roof side rail segment 22A and a right roof side rail segment 22B which extend in the longitudinal direction of the vehicle and, in the closed position of the vehicle roof 10, laterally bound the front roof segment 12 and the central roof segment 14. As can be gathered from FIG. 5, in the closed position illustrated in FIG. 1, the front, free end sides of the roof side rail segments 22A and 22B border a front cowl 84 connecting A pillars of the vehicle body.

The vehicle roof 10 is opened in such a manner that, first of all, the front roof segment 12, which is designed as the sliding roof cover element which runs over the outside, is moved over the central roof segment 14, the roof side rail segments 22A, 22B are pivoted outward with reference to the longitudinal center plane of the vehicle, the rear roof segment 16 is pivoted over the unit formed from the front roof segment 12 and the central roof segment 14 and then the package comprising central roof segment 14, front roof segment 12, rear roof segment 16 and roof side rail segments 22A, 22B are put away by means of a system of links (not illustrated specifically here) in the convertible-top storage compartment.

The front roof segment 12, which is designed as the sliding roof cover element which runs over the outside, is movable separately to the rear over the central roof segment 14, with the vehicle roof 10 otherwise closed, in order to open a roof opening bounded by the roof side rail segments 22A, 22B, the front cowl and the central roof segment 14. Guide arrangements 24A, 24B are provided for guiding the front roof segment 12, said guide arrangements, in the closed position of the vehicle roof 10, extending along the respectively assigned roof side rail segment 22A and 22B and, as can be gathered in particular from FIG. 7 with respect to the left roof region, each comprising a guide rail 26 in which a sliding element 28, which is connected to the front roof segment 12 via a support 30, is guided displaceably in the longitudinal direction of the vehicle. When the front roof segment 12 moves back over the central roof segment 14, the sword-like support 30 reaches through a slot between the central roof segment 14 and the respectively assigned roof side rail segment 22A and 22B, which is sealed off by means of a sealing and drainage system 32 illustrated in particular in FIG. 2.

Figure 2:
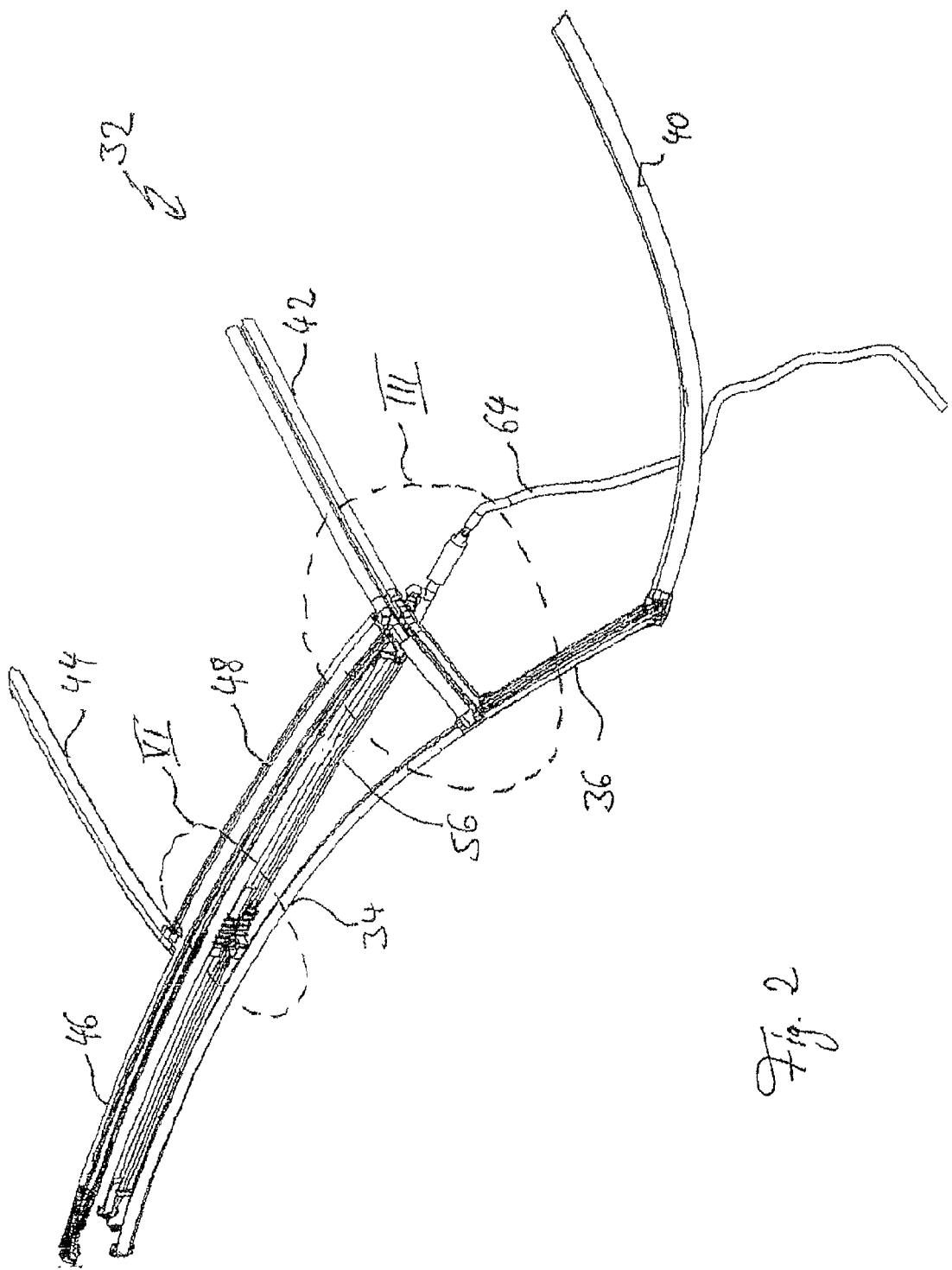
FIG. 2 shows a sealing and drainage system of the vehicle roof according to FIG. 1.
Figure 3:
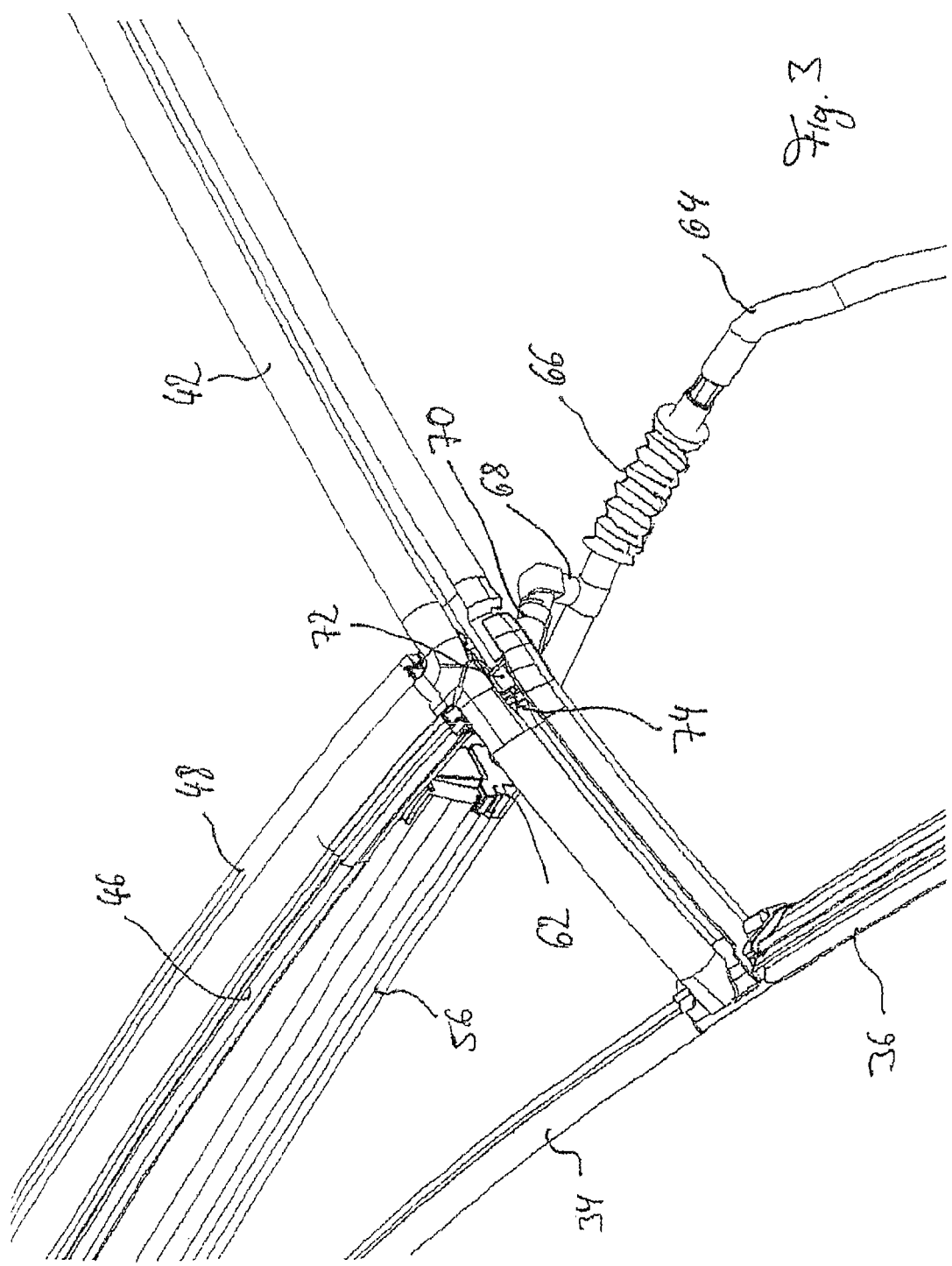
FIG. 3 shows an enlarged view of the region III in FIG. 2.
Figure 4:
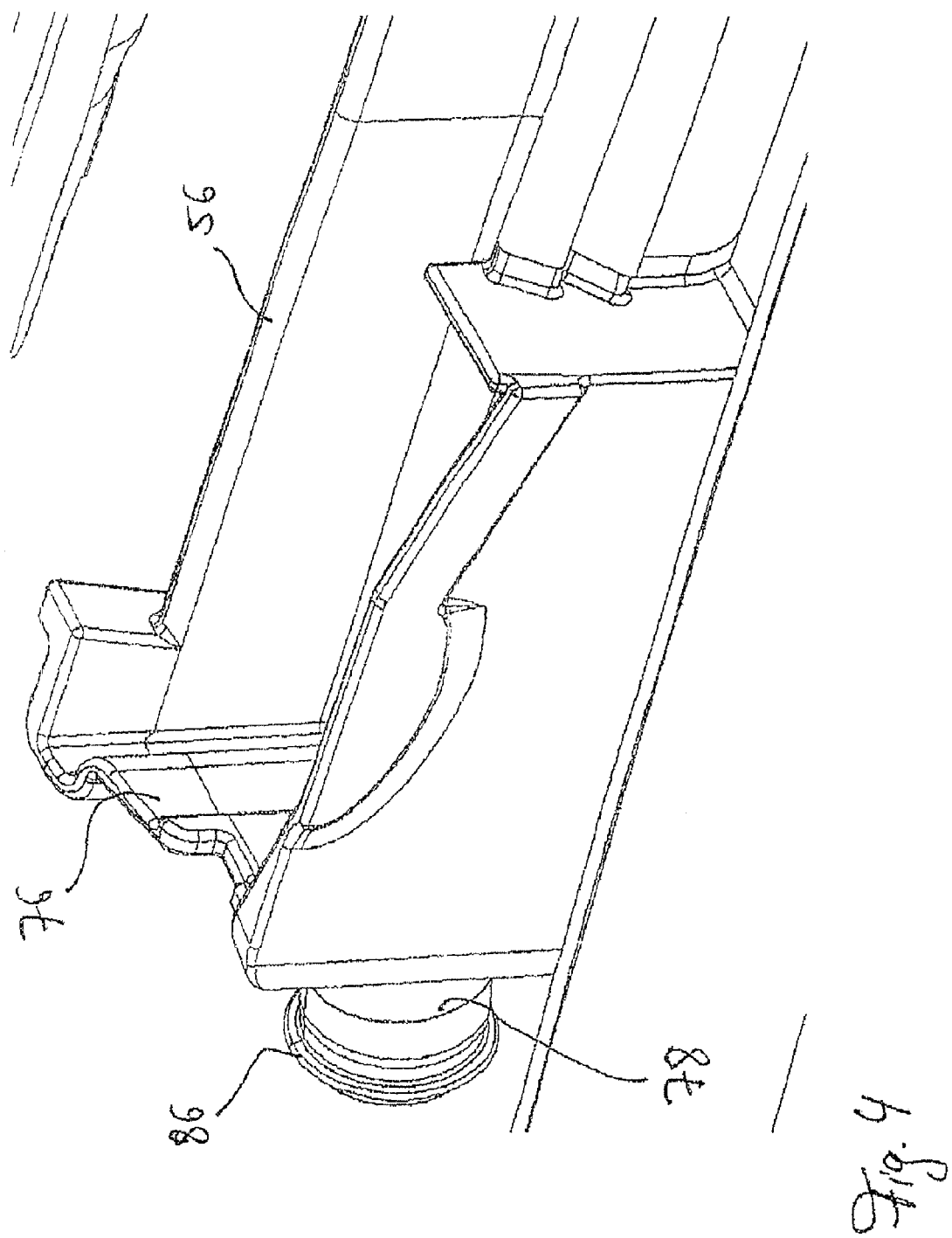
FIG. 4 shows an enlarged view of a front end region of a drainage channel.

The sealing and drainage system 32 extends along the boundaries of the vehicle roof 10 and along the transitions between the individual roof segments 12, 14, 16, 22A and 22B. The sealing and drainage system 32 is illustrated in FIG. 2 for that region of the vehicle roof 10 which is on the left in the direction of travel. In the right region of the vehicle roof 10, the sealing and drainage system 32 is of mirror-symmetrical design with respect thereto.

In the right region of the vehicle roof 10, the sealing and drainage system 32 comprises an outer sealing profile 34 which is arranged between the roof side rail segment 22A and vehicle side windows (not illustrated specifically here), and a sealing profile 35 which adjoins the sealing profile 34, laterally bounds the rear roof segment 16 and adjoins a rear side window of the vehicle body. Furthermore, a rear sealing profile 40 is formed on a lower edge of the rear roof segment 16, said sealing profile, in the closed state of the vehicle roof 10, sealing a gap between the rear roof segment 16 and a convertible-top storage compartment cover. In order to seal a gap between the rear roof segment 16 and the central roof segment 14, a sealing profile 42 which extends in the transverse direction of the vehicle is provided. In order to seal a gap between the central roof segment 14 and the front roof segment 12, a sealing profile 44 which extends in the transverse direction of the vehicle is likewise formed. A sealing profile 46 which extends in the longitudinal direction of the vehicle and is fixed to the roof side rail segment 22A extends along the inside of the roof side rail segment 22A. A further sealing profile 48 is formed in the region between the roof side rail segment 22A and the central roof segment 14. When the front roof segment 14 which is designed as a sliding roof which runs over the outside is moved back, the support 30 between the sealing profile 48 and the sealing profile 46 moves to the rear or, when the front roof segment 12 is closed, to the front.

Figure 7:
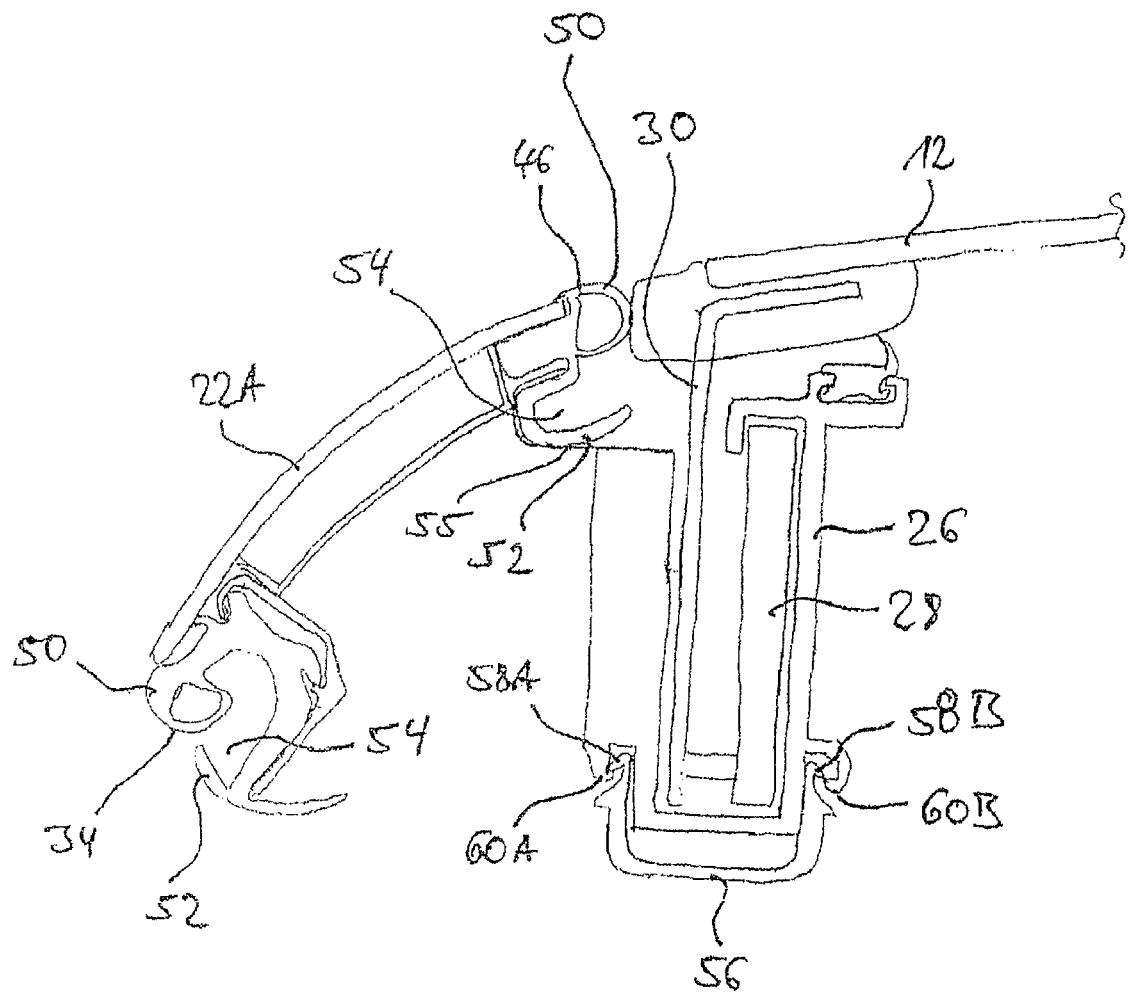
FIG. 7 shows a schematic section along the line VII-VII in FIG. 1.

As can be gathered in particular from FIG. 7 with reference to the sealing profiles 34 and 46, the sealing profiles each have a primary tube 50 and a secondary lip 52. A leak water channel 54 is located in each case between the primary tube 50 and the secondary lip 52.

Furthermore, a flexible water guiding film 55 is clamped between the sealing profile 46 and the guide rail 26 and therefore connects the roof side rail segment 22A to the guide rail 26 in a sealing manner and conducts any leak water which has arisen into the region of the guide rail 26. This is advantageous in particular if the roof joint profile does not run parallel to the guide rail.

Furthermore, a water drainage channel 56 which is manufactured from plastic is arranged below the guide rail 26 and is fixed to corresponding latching rails 60A and 60B of the guide rail 26 by means of latching rails 58A and 58B.

On the rear side, the water drainage channel 56 has an end wall 62 with an opening to which a water drain hose 64 is adjoined. The water drain hose 64, which is provided with a bellows-like section 66 in order to absorb movements of the system of links for opening and closing the vehicle roof, is guided along the system of links for opening and closing the vehicle roof and is connected to the outside of the vehicle in the region of the rear, left wheel house. Water which has collected in the water drainage channel 56 can therefore be removed to the surroundings in a controlled manner via the drain hose 64 and the wheel house.

Upstream of the bellows-like section 66, the drain hose 64 is provided with a T piece 68 at which a passage 70 opens, which passage is connected to a trough-like section 72 in the region of a leak water channel of the sealing profile 42 which is arranged between the rear roof segment 16 and the central roof segment 14 and is likewise provided with a primary tube and a secondary lip between which the leak water channel is located. Said leak water channel is furthermore interrupted by a partition 74 which is located further to the outside, with reference to the longitudinal center plane of the vehicle, than the trough-like section 72 and which ensures that essentially no leak water which accumulates in the sealing profile 42 flows to the outside but rather is guided via the trough-like section 72 and the passage 70 branching off from the latter to the drain hose 64 and from there to the wheel house concerned.

The water drainage channel 56 furthermore has a front end wall 76 which is provided with a snout-like water drainage connecting piece 78 which, in the closed position of the vehicle roof 10, interacts with a corresponding opening 80 of a fitting 82 of the front cowl 84 and, for this purpose, has a sealing lip 86. The water drainage connecting piece 78 is centered with respect to the opening 80 by means of a closure pin 88 which is formed on the relevant roof side rail segment 22A or 22B and engages in a corresponding opening 90 of the fitting 82. Leak water which drains to the front flows out of the water drainage channel 56 via the water drainage connecting piece into a hose 81 which adjoins the opening 80, is plugged onto the fitting 82 and is guided by an A pillar of the vehicle body to a front wheel house.

Furthermore, the water drainage channel 56 has, in a central region, a flexible, elastically extendable, bellows-like section 92 which is located in the transition region between a front and a rear subsection of the guide rail 26 and makes it possible for relative movements between the two guide rail subsections to be absorbed. The front guide rail subsection can therefore be pivoted outwards with respect to the longitudinal center plane of the vehicle together with the roof side rail segment 22A or 22B whereas the rear guide rail subsection is fixed to the central roof segment 14.

A corresponding water drainage channel (not illustrated specifically here) is arranged in the region of the right guide arrangement 24B.

The invention claimed is:

1. A vehicle roof, with at least two rigid roof segments which can be displaced between a closed position covering a vehicle interior and a storage position opening up the vehicle interior and which, in the closed position, are arranged consecutively in the longitudinal direction of the vehicle and, in the storage position, are stowed in a convertible-top storage compartment, characterized in that one roof segment is designed as a sliding roof cover element which runs over the outside of the vehicle and is guided on both sides of the one roof segment in a respective guide arrangement which extends in the longitudinal direction of the vehicle and below which a water drainage channel which extends in the longitudinal direction of the vehicle is arranged.

2. The vehicle roof of claim 1, characterized in that the water drainage channel can be emptied in a rearward region of the vehicle via a drain hose leading to the outside of the vehicle.

3. The vehicle roof of 2, characterized in that the drain hose leads along a system of links to a wheel house of the vehicle.

4. The vehicle roof of claim 2, characterized in that the drain hose has an expansion-bellows-like insert.

5. The vehicle roof of claim 1, characterized in that the water drainage channel is provided on a front end side with a connecting piece which, in the closed position, engages in a corresponding opening of a drain passage in the region of a front cowl of the vehicle.

6. The vehicle roof of claim 2, further comprising a sealing and drainage system arranged between the roof segments; the drain hose connected to the sealing and drainage system by a T-piece.

7. The vehicle roof of claim 6, characterized in that two roof side rail segments are provided, between which a front roof segment, which serves as the sliding cover which runs over the outside, and a central roof segment, which is adjoined in the closed direction by a rear roof segment, are arranged, with the guide arrangement being arranged in each case between the roof side rail segments, on the one hand, and the front roof segment and the central roof segment, on the other hand, and, in the closed position between the individual segments, the sealing and drainage system being arranged in the transition regions between the individual segments.

8. The vehicle roof of claim 1, characterized in that the water drainage channel is latched to the guide arrangement.

9. The vehicle roof of claim 1, characterized in that the guide arrangement is formed from at least two subsections, and the water drainage channel is provided with an elastically extendable section in the region of the transition between the subsections.

* * * * *